(12) United States Patent
Zhang et al.

(10) Patent No.: US 6,434,261 B1
(45) Date of Patent: *Aug. 13, 2002

(54) METHOD FOR AUTOMATIC DETECTION OF TARGETS WITHIN A DIGITAL IMAGE

(75) Inventors: Xiao-Ping Zhang, Dundas (CA); Mita D. Desai, San Antonio, TX (US)

(73) Assignee: Board of Regents, The University of Texas System, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,250

(22) Filed: Feb. 23, 1998

(51) Int. Cl.[7] .............................. G06K 9/00; G06K 9/34; G06K 9/38
(52) U.S. Cl. ...................... 382/132; 382/171; 382/172
(58) Field of Search ................................ 382/128, 132, 382/169, 170, 171, 172

(56) References Cited

U.S. PATENT DOCUMENTS

| 5,576,548 | A |   | 11/1996 | Clarke et al. ............... 250/369 |
| 5,598,481 | A |   | 1/1997 | Nishikawa et al. ......... 382/130 |
| 5,666,434 | A |   | 9/1997 | Nishikawa et al. ......... 382/128 |
| 5,673,332 | A |   | 9/1997 | Nishikawa et al. ......... 382/128 |
| 5,740,268 | A | * | 4/1998 | Nishikawa et al. ......... 382/132 |
| 5,872,859 | A | * | 2/1999 | Gur et al. .................... 382/128 |
| 5,982,917 | A | * | 11/1999 | Clarke et al. ............... 382/132 |
| 5,995,644 | A | * | 11/1999 | Lai et al. ..................... 382/131 |

OTHER PUBLICATIONS

Robini et al, "Two–dimensional ultrtasonic flaw detection based on the wavelet packet transform"; IEEE Transaction on Ultrasonics, Ferroelectric and frequency Control; vol. 44, Issue 6, pp. 1382–1394, Nov. 1997.*

Nesbitt et al, "Detection of microcalcifications in digitized mammogram film images using wavelet enhancement and local adaptive false positive suppression"; IEEE Conference on Communications, Computers and Signal Processing; pp. 594–597, May 1995.*

Strickland et al, "Wavelet transform methods for object detection and recovery"; IEEE transaction on Image Processing; vol. 6, Issue 5, pp. 724–735, May 1997.*

Braithwaite et al, "Hierarchical Gabor filters for object detection in infrared images"; IEEE Conference on Computer Vision and Patter Recognition; pp. 628–631, Jun. 1994.*

(List continued on next page.)

Primary Examiner—Amelia M. Au
Assistant Examiner—Mehrdad Dastouri
(74) Attorney, Agent, or Firm—Fulbright & Jaworski L.L.P.

(57) ABSTRACT

The present invention comprises a method for the detection and segmentation of bright images within a digital image using wavelets. One example of such a bright image is microcalcifications within a mammogram. Multiresolution analysis may be used to detect and segment the possible microcalcification areas by combining Bayes classifiers. By analyzing the time-frequency characteristics of clustered microcalcifications, the inventors first choose the optimized wavelet for the detection of microcalcifications. A wavelet packet analysis is then used to detect different size microcalcifications. An adaptive method of choosing the threshold for detection by using a one-dimensional wavelet transform to analyze the PDF of the images at different scales is used. Then, a scheme to detect different size microcalcifications in different scale wavelet packet transformed images is developed. The processing results show that the inventors' methods are quite effective on a broad sample of mammograms in detecting microcalcifications even at low contrast. These segmentation and detection methods will prove useful in other applications, such as other medical imaging infrared applications, forward-looking infrared radar (FLIR), and other technologies.

21 Claims, 15 Drawing Sheets

OTHER PUBLICATIONS

Wang et al, "Optimizing the resolution Level in Wavelet Transform–Applied to Image Restoration"; IEEE paper on Cybernetics and Simulation, ISBN: 0–7803–4053–1, vol. 3, pp. 2666–2671, Oct. 1997.*

Batman and Dougherty, "Size distributions for multivariate morphological granulometries: texture classification and statistical properties," *Optical Eng.* , 36(5):1518–1529, 1997.

Bowyer and Astley, *State of the Art in Digital Mammographic Image Analysis*, World Scientific, 1994. (Table of Contents Only).

Brzakovic et al., "An approach to automated detection of tumors in mammograms," *IEEE Transactions Med. imaging*, 9(3):233–241, 1990.

Chitre and Dhawan, "Adaptive wavelet analysis and classification of mammographic microcalcification," *In: Digital Mammography*, Doi, Giger, Nishikawa, Schmidt, (Eds.), pp. 323–326, 1996.

Coifman, Meyer, Wickerhauser, "Wavelet analysis and signal processing," *In: Wavelets and their applications*, Ruskai et al., Ed., 153–178, Jones and Bartlett, Boston, MA, 1992.

Dengler et al., "Segmentation of microcalcifications in mammograms," *IEEE Transactions Med. Imaging*, 12(4):634–642, 1993.

Graps, "An introduction to wavelets," *IEEE Computational Science Eng.*, 2(2):1–18, 1995.

Mallat and Zhong, "Characterization of signals from multiscale edges," *IEEE Trans. on PAMI.*, 14(7):710–732, 1992.

Mallat and Hwang, "Singularity detection and processing with wavelets," *IEEE Trans. on Info. Theo.*, 38(2):617–643, 1992.

McLeod et al., "Automatic detection of clustered microcalcifications using wavelets," *In: Digital Mammography '96*, Doi, Giger, Nishikawa, Schmidt, (Eds.), pp. 311–316, 1996.

Rioul and Duhamel, "Fast algorithms for discrete and continuous wavelet transforms," *IEEE Trans. on Info. Theo.*, 38(2):569–586, 1992.

Strickland and Hahn, "Wavelet transforms for detecting microcalcifications in mammography," *Proc. ICIP–94*, 1:402–406, Austin, Texas, Nov. 13–16, 1994.

Strickland and Hahn, "Wavelet transforms for detecting microcalcifications in mammograms," *IEEE Transactions Med. Imaging*, 15(2):218–229, 1996.

Yoshida et al., "Optimally weighted wavelet packets for detection of clustered microcalcifications in digital mammograms," *In: Digital Mammography*, Doi, Giger, Nishikawa, Schmidt, (Eds.), pp. 317–322, 1996.

Yoshida et al., "Optimizing wavelet transform based on supervised learning for detection of microcalcifications in digital mammograms," *Proc. ICIP–95*, 3:152–155, Washington, D.C., 1995.

Zhang, Tian, Peng, "From the wavelet series to the discrete wavelet transform—the initialization," *IEEE Trans. on Signal Proc.*, 44(1), 1996, pp. 129–133.

Zhang and Desai, "Wavelet Based Automatic Thresholding for Image Segmentation," presented at 1997 Proceedings of ICIP, IEEE International Conference on Image Processing in Santa Barbara, CA, Oct. 26–29, 1997.

* cited by examiner

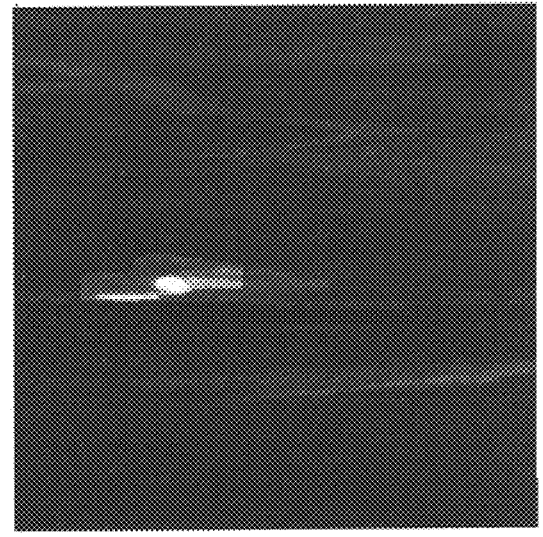
FIG. 13(a)
FIG. 13(b)
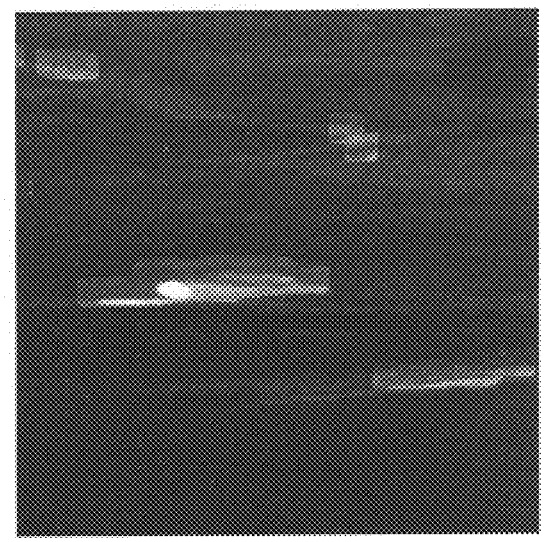
FIG. 14(a)
FIG. 14(b)

METHOD FOR AUTOMATIC DETECTION OF TARGETS WITHIN A DIGITAL IMAGE

BACKGROUND OF THE INVENTION

1. Field of the Invention

The present invention relates to image processing of digital images, and more specifically to image processing using a wavelet transform technique.

2. Description of Related Art

Currently, breast cancer is a leading cause of death among women. Nearly 10 percent of all women in North America will develop breast cancer during their lifetime (Bassell and Gold, 1987). Earlier diagnoses of breast cancer are of great importance in modem medicine. At present, mammography is the method of choice for early breast cancer detection. Automation of mammogram analysis by computer vision technology has been of interest to more and more researchers and radiologists (Bowyer and Astley, 1994; Dengler et al., 1993; Brzakovic et al., 1990).

Although automatic analysis of mammograms cannot fully replace radiologists, an accurate and efficient computer-aided analysis method can help radiologists to make more efficient and accurate decisions. Two of the very important objects of interest in mammograms that need to be detected and segmented in more detail are tumors and microcalcifications.

Recent developments in wavelet transform techniques can be very useful for such computer aided diagnosis. Multi-resolution processing techniques (Mallat, 1989; Daubechies, 1992) may be formulated and implemented by wavelet transforms. Currently, such techniques are widely used in image processing and analysis (Akansu and Smith, 1996). By using wavelet transforms and multiscale analysis, most of the gray scale information can be obtained in a large scale image, and singularity information, such as edge and texture, etc., can be detected in detailed images at different scales. A proper form of the wavelet transform and choice of a suitable mother wavelet is application-dependent. In addition, as will be discussed in detail below, the choice of pre-processing and post-processing methods may be critical to successful detection and classification of tumors and microcalcifications.

Several papers have been published in the area of application of wavelet transforms for analysis of mammograms (Yoshina et al., 1995; Strickland and Hahn, 1994; Strickland and Hahn, 1996; McLeod et al., 1996; Yoshida et al., 1996; Chitre and Dhawan, 1996). Most of these papers mainly deal with clustered microcalcifications, which appear as a relatively evident and larger bright area compared to the size of single microcalcifications.

However, the detection of single microcalcifications is also very important for the diagnoses of breast cancer, because often they are indicators of malignancy. It is easy to understand that these single microcalcifications may easily be overlooked by radiologists because of their small size. Therefore, computer-aided detection and segmentation are of great importance in these cases.

A goal of many types of image processing is to develop automated detection of objects of interest (generally referred to as "targets") from a noisy, cluttered background.

Many methods for segmenting targets from a noisy, cluttered background have been developed. Among these, many involve greyscale-based thresholding strategies, which usually assume the image to have a uniform and stationary, or at least quasi-stationary, distribution of intensities over the target and background. Such methods are generally not very effective when images have complex, nonstationary distributions of intensities. It is usually difficult to adapt global techniques by simply using local processing, since the resulting operators are usually more sensitive to noise and generally yield desultory improvement.

However, if the image is observed at a particular scale, or range of scales, viz., by passing it through a bandpass filter, the resulting image intensity distribution will often exhibit a greater degree of local stationarity. In this way, the performance of local, adaptive segmentation/ thresholding algorithms may be improved.

SUMMARY OF THE INVENTION

The present invention presents a new method for the detection and segmentation of small, single microcalcifications.

Wavelet transform-based methods offer a natural framework for providing multi-scale image representations that may be separately analyzed. For example, through a multi-scale wavelet decomposition, most of the gross intensity distribution can be isolated in a large scale image, while information about details and singularities, such as edges and textures, can be isolated in mid- to small scales.

The present invention presents a new and systematic method for the segmentation of potential target areas based on a selected wavelet decomposition and a Bayes classifier. Further, an adaptive, multi-scale threshold selection criterion is disclosed, which analyzes the image probability distribution function (PDF).

The term "bright target" as used herein means a connected, cohesive object which has an average intensity distribution above that of the rest of an image. Such targets usually appear as having a blob-like appearance. Of course, other image components may occur that are bright, but which may be poorly connected or which occur only over a small scale. Through the use of a natural multiscale decomposition, such as an appropriate wavelet transform, coherent targets may be separated and subsequently distinguished from transient bright objects.

Presented is an approach to target segmentation that involves isolating the putative target scale through selection of an appropriate scale in the wavelet decomposition, then thresholding the single-scale image using a Bayesian classifier. The method is used as a benchmark comparison for the methods of the present invention. The Bayesian approach, while optimal in a statistical sense, requires certain a priori information and suffers from some limitations.

The present invention includes a method of determining an adaptive threshold for a wavelet analysis of a digital image, which includes the steps of: decomposing the digital image by wavelet packet transform to obtain transformed images of different scale channels; obtaining a histogram of the transformed images; decomposing the histogram by wavelet transform to obtain histogram images of different scale channels; and selecting the adaptive threshold from the histogram images.

The present invention also includes a method of determining an adaptive threshold for a wavelet analysis of a digital image comprising the steps of: decomposing the digital image by wavelet packet transform to obtain transformed images of different scale channels; and selecting a minimum point of a probability distribution function of the transformed images by wavelet analysis.

The present invention also includes a method for automatically detecting an abnormal portion of a digital image comprising the steps of: obtaining the digital image; selecting a mother wavelet optimized for the digital image; decomposing the digital image by wavelet packet transform into various channels; determining an adaptive threshold from all channels; comparing the adaptive threshold to each of the channels; eliminating each of the channels less than the minimum threshold to obtain an adjusted singularity map; restoring the adjusted singularity map to a restored image; and locating regions in the digital image corresponding to the restored image.

The present invention also resides in a method of obtaining a microcalcifications map from a mammogram image, including the steps of: inputting a digitalized mammogram image; preprocessing the image (normalization is one example); obtaining wavelet packet transforms of the image; performing wavelet-based analysis of a probability distribution function of the transformed images at different channels; selecting thresholds and obtaining segmented images of each channel; mapping the segmented images of each channel to the original digital image; and combining all of the mapped images to obtain the microcalcifications map.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 13a is an illustration of a segmentation area using $\lambda_3$.

FIG. 13b is an illustration of the masked image of FIG. 13a by $I_{seg}$·I+I.

FIG. 14a is an illustration of a segmentation area using $\lambda_2$.

FIG. 14b is an illustration of the masked image of FIG. 14a by $I_{seg}$·I+I.

DESCRIPTION OF ILLUSTRATIVE EMBODIMENTS

Figure 1A:
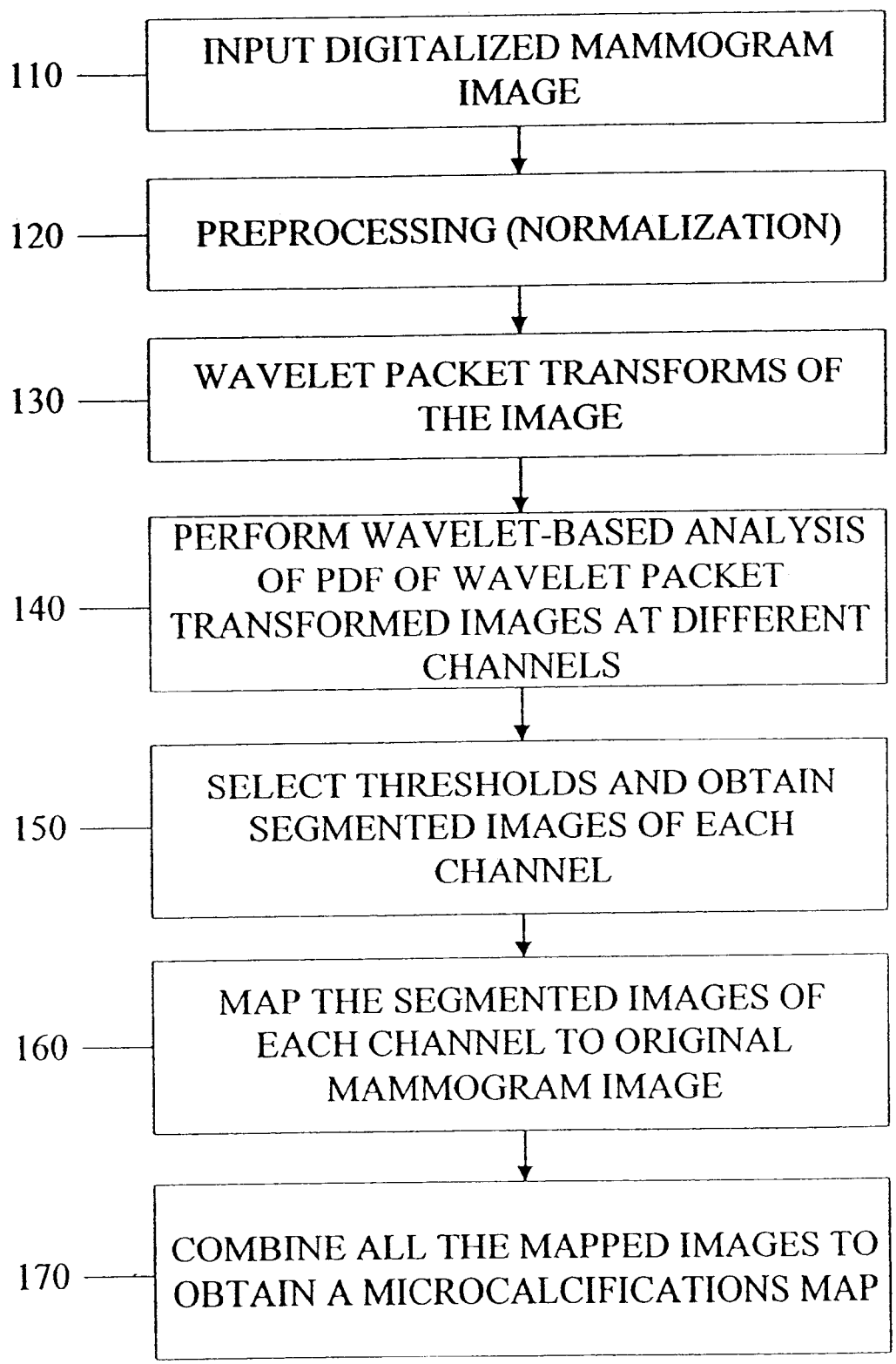
FIG. 1A is a flow diagram of a method according to the present invention.

The present invention resides in a method of obtaining a microcalcifications map from a mammogram image. FIG. 1A is a flow diagram of the method, which shows the steps of: inputting a digitalized mammogram image (110); preprocessing the image (normalization is one example) (120); obtaining wavelet packet transforms of the image (130); performing wavelet-based analysis of a probability distribution function of the transformed images at different channels (140); selecting thresholds and obtaining segmented images of each channel (150); mapping the segmented images of each channel to the original digital image (160); and combining all of the mapped images to obtain the microcalcifications map (170).

Figure 1B:
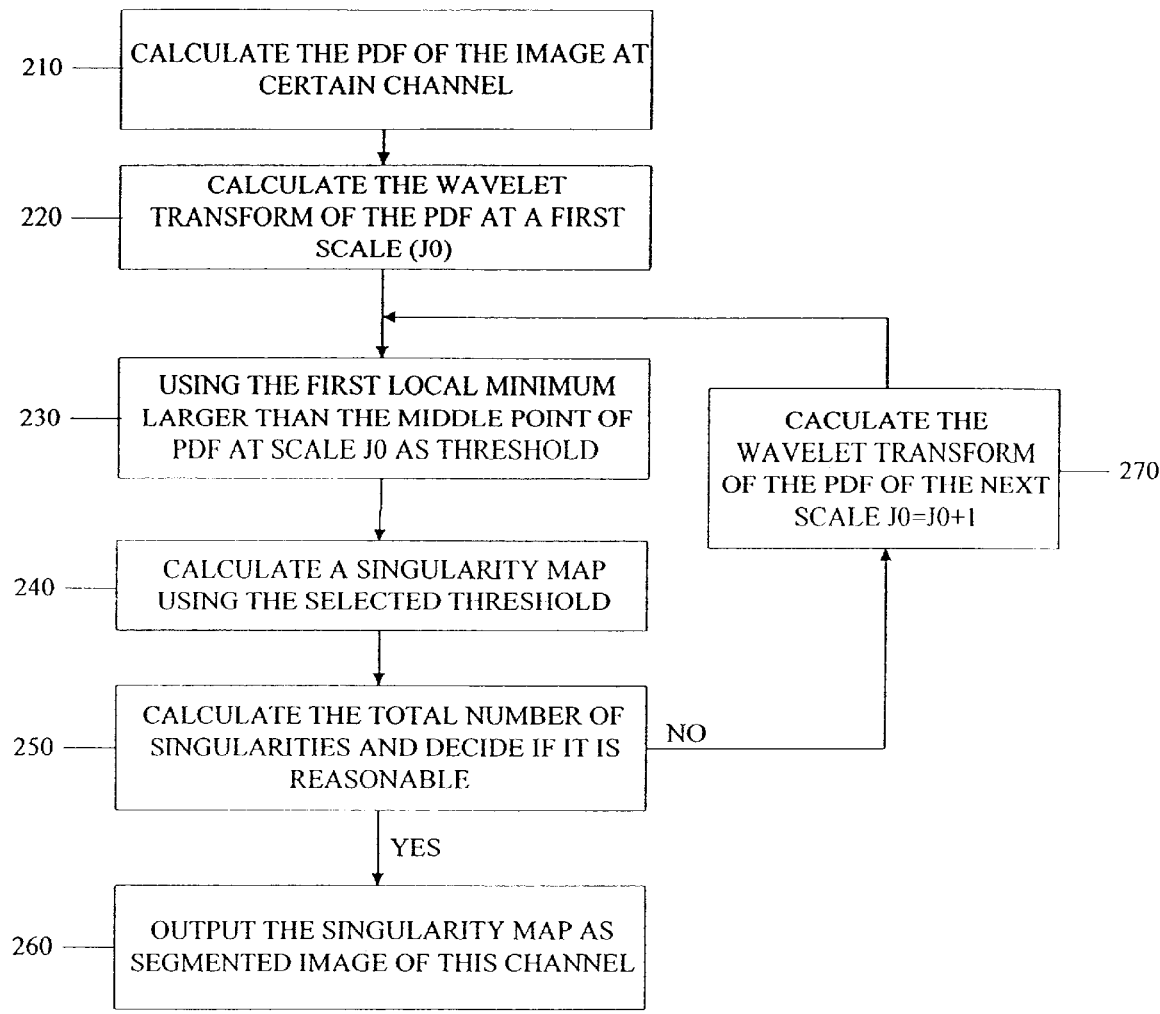
FIG. 1B is a flow diagram of an adaptive thresholding method according to the present invention.

FIG. 1B is a flow diagram of a particular embodiment of the step of selecting thresholds and obtaining segmented images. As shown in FIG. 1B, this may include the steps of: calculating the probability distribution function of the image at a certain channel (210); calculating the wavelet transform of PDF at a first scale (220); using the first local minimum larger than the middle point of the PDF at that scale as the threshold (230); calculating a singularity map using the selected threshold (240); and calculating the total number of singularities and determining whether that number is reasonable (250). If that number is reasonable, then the singularity map is output as the segmented image of that channel (260). Otherwise, if the number of singularities is not reasonable, then the wavelet transform for the probability distribution function of the next scale channel is calculated (270); and the threshold is redetermined at block 230.

Figure 1C:
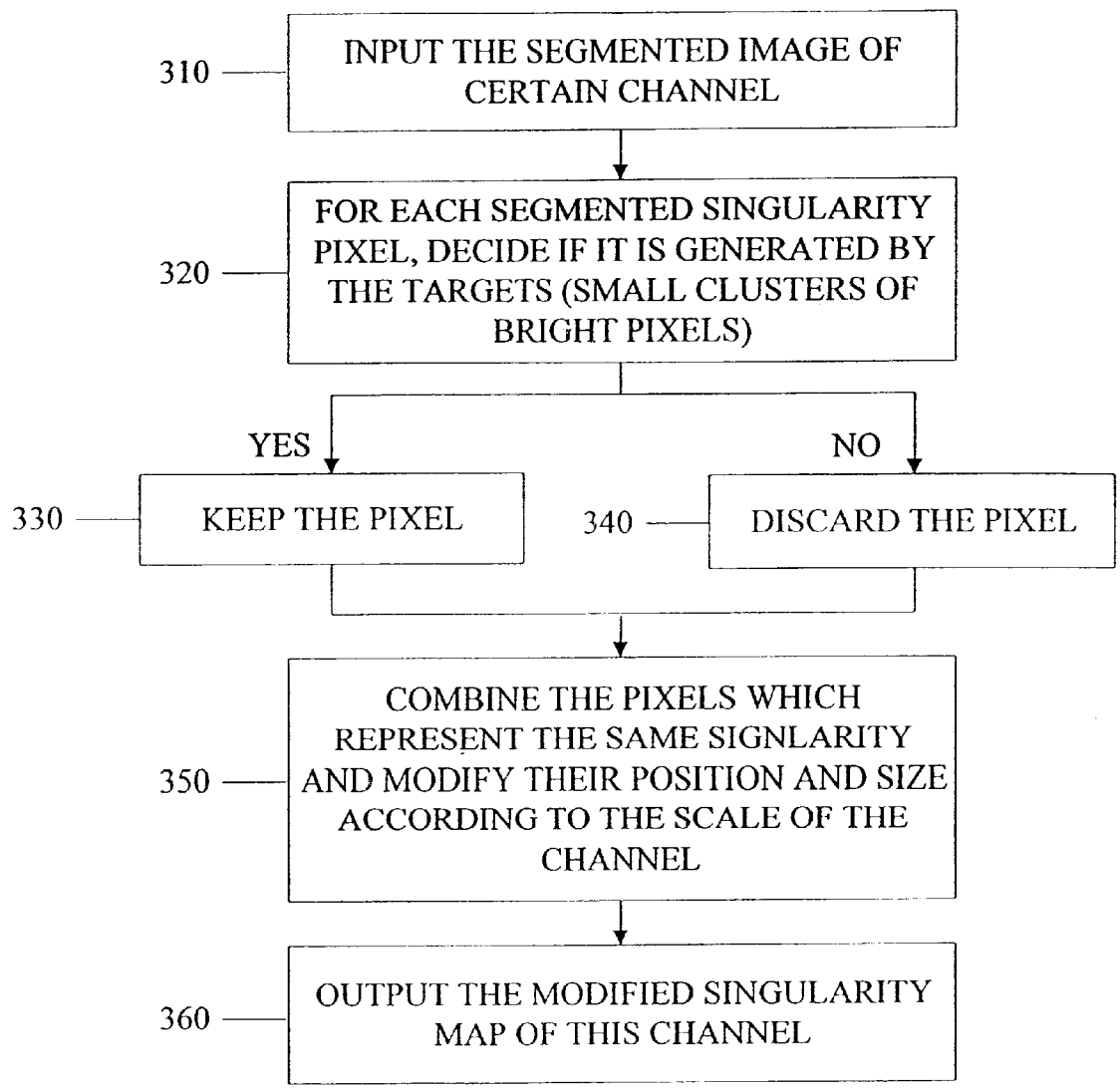
FIG. 1C is a flow diagram of a mapping algorithm according to the present invention.

The present invention also resides in a mapping algorithm for a singularity map of a certain channel scale. As shown in FIG. 1C, which is a flow diagram of the method, this embodiment includes the steps of inputting the segmented image of a certain channel (310); determining for each segmented singularity pixel whether it is generated by a target (320). If the answer is yes, then the pixel is kept (330). Otherwise, the pixel is discarded (340). Then, the kept pixels which represent the same singularity are combined and their position and size are modified according to the scale of the particular channel (350). Finally, the modified singularity map of this channel is outputted (360).

Choosing An Optimized Mother Wavelet For Detection Of Microcalcification

The wavelet transform has been used to process mammograms by several researchers (Yoshina et al., 1995; Strickland and Hahn, 1994; Strickland and Hahn, 1996) because wavelet transform often has a suitable joint time-frequency localization. Other examples of uses of wavelet transforms for processing medical images are disclosed in U.S. Pat. No. 5,576,548 to Clarke et al. entitled "Nuclear Imaging Enhancer," and U.S. Pat. No. 5,673,332 to Nishikawa et al. entitled "Computer-Aided Method for Image Feature Analysis and Diagnosis in Mammography," which are hereby expressly incorporated by reference.

The continuous wavelet transform (CWT) is defined as:

$$CWT_f^\psi(a, b) = \langle f, \psi^{a,b} \rangle = |a|^{-\frac{1}{2}} \int f(t) \overline{\psi}\left(\frac{t-b}{a}\right) dt \quad (1)$$

where a and b are scale and time parameters, respectively, and $\psi(t)$ is the mother wavelet.

Due to heavy redundancy, the CWT may be sampled in the time-scale plane (a, b) with a dyadic grid ($2^m$, $n2^m$) to form a wavelet series (WS). An orthogonal dyadic wavelet transform is a kind of special wavelet series in which the signal can be decomposed on an orthogonal wavelet bases. This kind of wavelet transform may be described by multiresolution analysis, and may be calculated by the multiresolution filter pyramidal algorithm established by Mallat (1989).

$$\langle f, \phi_{j,k} \rangle = \sum_k \langle f, \phi_{j-1,k} \rangle g(k - 2n) \quad (2)$$

$$\langle f, \psi_{j,k} \rangle = \sum_k \langle f, \phi_{j-1,k} \rangle h(k - 2n) \quad (3)$$

where $\phi(t)$ and $\psi(t)$ are scaling function $\phi(t)$ and wavelet $\psi(t)$, respectively, and g and h are their associated filters. $\{\phi_{j,k}\}_{k \in Z}$ forms a basis in the multiresolution analysis subspace $V_j$.

In this case, the wavelet basis can be expressed by the filters. In practice, discrete-time signals are often encountered. Then, the discrete (time) wavelet transforms (DWT) may be defined by discrete multiresolution analysis (Rioul, 1993; Rioul and Duhamel, 1992; Shensa, 1992). Such discrete multiresolution analysis is not the same as a continuous time wavelet transform, but they are similar in both concept and computation (Zhang et al., 1996).

The above wavelet transform and multiresolution analysis may be generalized to two dimensions for image processing applications. For general separable multiresolution analysis and corresponding wavelet transforms, there are three two dimensional wavelets associated with the scaling function $\phi(x)$. The two dimensional scaling function can be written as:

$$\Phi(x,y) = \phi(x)\phi(y)$$

and the wavelets as:

$$\Psi^1(x,y) = \phi(x)\psi(y), \Psi^2(x,y), \psi(x)\phi(y), \Psi^3(x,y) = \psi(x)\psi(y)$$

Figure 2:
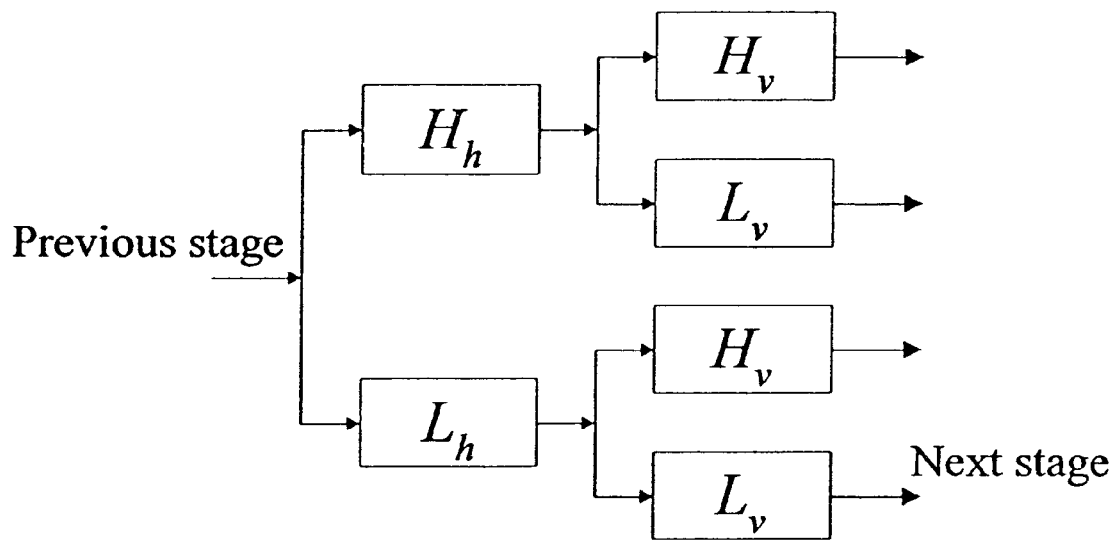
FIG. 2 is a block diagram of one stage of a two dimensional wavelet decomposition.

The one stage wavelet decomposition by subband filter may then be described as shown in FIG. 2.

Each transform stage provides four subimages. According to the frequency channels in horizontal and vertical directions, they are noted as parts $L_h H_v$ part, $H_h L_v$ part and $H_h H_v$ part, in which the "H" stands for the high frequency channel and "L" stands for the low frequency channel. The subscripts h and v indicate the horizontal direction and the vertical direction, respectively. In standard wavelet transform, the next transform stage is continued based on the $L_h L_v$ part.

However, the choice of mother wavelet is still seldom discussed. It is well known that every type of linear time-frequency and time-scale analysis does not result in an arbitrary small joint time-frequency resolution cell. The joint resolution $\Delta t \Delta f$ cannot be less than the limit ½ which is defined by the uncertainty principle (Cohen, 1989). There is always a trade-off between time localization (resolution) and frequency localization. The resolution cell of wavelet analysis has a constant relative frequency bandwidth, which makes it suitable for many applications in signal processing. Nevertheless, the basic shape of the resolution cell of the wavelet transform, which is determined by the mother wavelet, should be selected depending on the application. In other words, depending on the application, a user should select the suitable time localization in a certain frequency channel.

For example, microcalcifications often appear as bright clustered pixels. One can expect to get this information in high frequency channels in wavelet transform. However, what kind of joint time-frequency localization is suitable for detection of microcalcifications?

The wavelet filter is a band pass filter with the pass band approximately in [½, 1] in the frequency domain. Its frequency localization will improve as the filter length increases. As shown in Table 1 with symbol "x" representing the high greyscale value pixel and symbol "o" represent the low greyscale value pixel, the relationship between the temporary pixel patterns and the frequency channels can be expressed as follows:

TABLE 1

| Time-Frequency Localization of Different Patterns | | |
|---|---|---|
| One Period Pattern | Two Period Pattern | Frequency Channel |
| xo | xoxo | [½, 1] |
| xxoo | xxooxxoo | [¼, ½] |
| ... | ... | |
| x...x  0...0 | x...x  0...0  x...x  0...0 | [$2^{-n}$, $2^{-n+1}$] |
| ↓        ↓ | ↓       ↓       ↓       ↓ | |
| $2^{n-1}$  $2^{n-1}$ | $2^{n-1}$  $2^{n-1}$  $2^{n-1}$  $2^{n-1}$ | |

From Table 1, it can be determined that if one wants to identify the one period pattern at frequency channel [½, 1], then the time localization of the band pass filter should be 2 taps. It is to be understood that "tap" is a general used term to indicate the length of a filter. If one wants to identify the two periods pattern at frequency channel [½, 1], then the tithe localization of the band pass filter should be 4 taps. Similarly, if one wants to identify the one period pattern at frequency channel [¼, 1/2], then the time localization of the band pass filter should be 4 taps. Similarly, for two periods pattern at frequency channel [¼, 1/2], the time localization of the band pass filter should be 8 taps. More generally, for k periods pattern at frequency channel [$2^{-n}$, $2^{-n+1}$], the time localization of the band pass filter should be $k2^n$.

Although the one pixel and one period pattern "xooo" may also appear at frequency channel [½, 1] with the filter length 4 taps, the time localization of the analysis becomes poorer, and the output value of the filter will be lower than that of the 2 tap filter. When the length of band pass filter in frequency channel [½, 1] increases, the frequency localization of the filter may be better, but for one pixel and one period pattern "xoo . . . o," both the time localization of the analysis and the output value of the filter becomes poorer. Thus, it is difficult to discriminate this pattern from other types of patterns in this frequency channel.

In digital mammograms, microcalcifications appear as isolated bright pixel clusters with sizes between about 100 $\mu$m–500 $\mu$ (Kopans, 1989), i.e., 1×1–5×5 pixels for 100 $\mu$m resolution images, or 2×2–10×10 pixels for 50 $\mu$m resolution images. Of course, the area of clustered microcalcifications will be larger. It cannot be expected that they will appear as multi-period patterns. Most microcalcifications appear as an isolated singularity in the image. Hence, they can only be modeled as the above one period pattern. The inventors have noted that the best time localization of analysis filter length should be $2^n$ for one period pattern at frequency channel $[2^{-n}, 2^{-n+1}]$, in which n is the size of the bright clustered pixels. For a dyadic compactly supported orthogonal discrete wavelet, such CQF (conjugate quadrature filter) wavelet filter is optimally a 2 tap Daubechies filter, which is the shortest of the Daubechies filters. This wavelet filter is also called Haar filter and the associated wavelet is so-called Haar wavelet.

Detection of Microcalcifications Using Wavelet Packet Analysis

Figure 3:
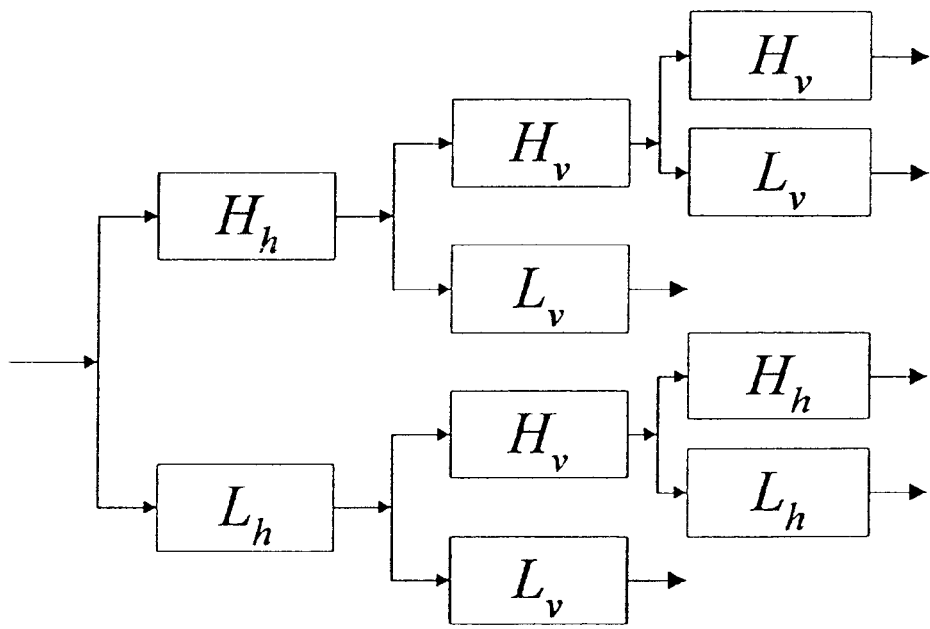
FIG. 3 is a block diagram of a two dimensional wavelet packet tree.

The cascaded subband filter banks for wavelet transform form a subband tree structure, and the wavelet transform divides time-frequency domain by constant Q resolution cells. This type of split is often effective in signal processing applications, because often a higher time resolution for higher frequency components and high frequency resolution for lower frequency components (Rioul and Vetterli, 1991) is desired. However, this standard wavelet transform is not suitable for all applications. Wavelet packets are the generalization of wavelet basis (Coifman et al., 1992; Ramchandran and Vetterli, 1993; Herley et al., 1993). The basic concept of wavelet packets is to produce an arbitrary time-frequency split, which depends on the application. That is, in above wavelet subband trees, one can cascade the basic transform stage to any subimage to construct a new tree, instead of taking only the $L_hL_v$ part of each stage. It can also form a basis of $L^2(R)$. An example of such a wavelet packet tree is shown in FIG. 3.

As discussed above, singularity information appears in higher frequency channels, while greyscale mass information appears in lower frequency channels. However, as indicated above, the normal two dimensional wavelet transform can only decompose the $L_hL_v$ part of the image iteratively. Then, this type of transform is only sensitive to three types of pattern of singularities, i.e., Singularity in the horizontal direction, which will appear in the $H_hL_v$ part;

Singularity in the vertical direction, which will appear in the $L_hH_v$ part; and The singularity with the same scale in both directions, which will appear in the $H_hH_v$ part.

Obviously, the first and second patterns can only identify edges with different scales. The third pattern is suitable to identify the singularities with an approximately square shape. However, most of the microcalcifications in digital mammograms do not fit this model of approximately square shape. It can be 1-N×1-N. For 100 $\mu$m resolution images N=5, where N will be larger for clustered microcalcifications. Note that by "size," the inventors mean the "size" of a scale and not an accurate size. The accurate size of different scales depends on the mother wavelet.

Figure 4:
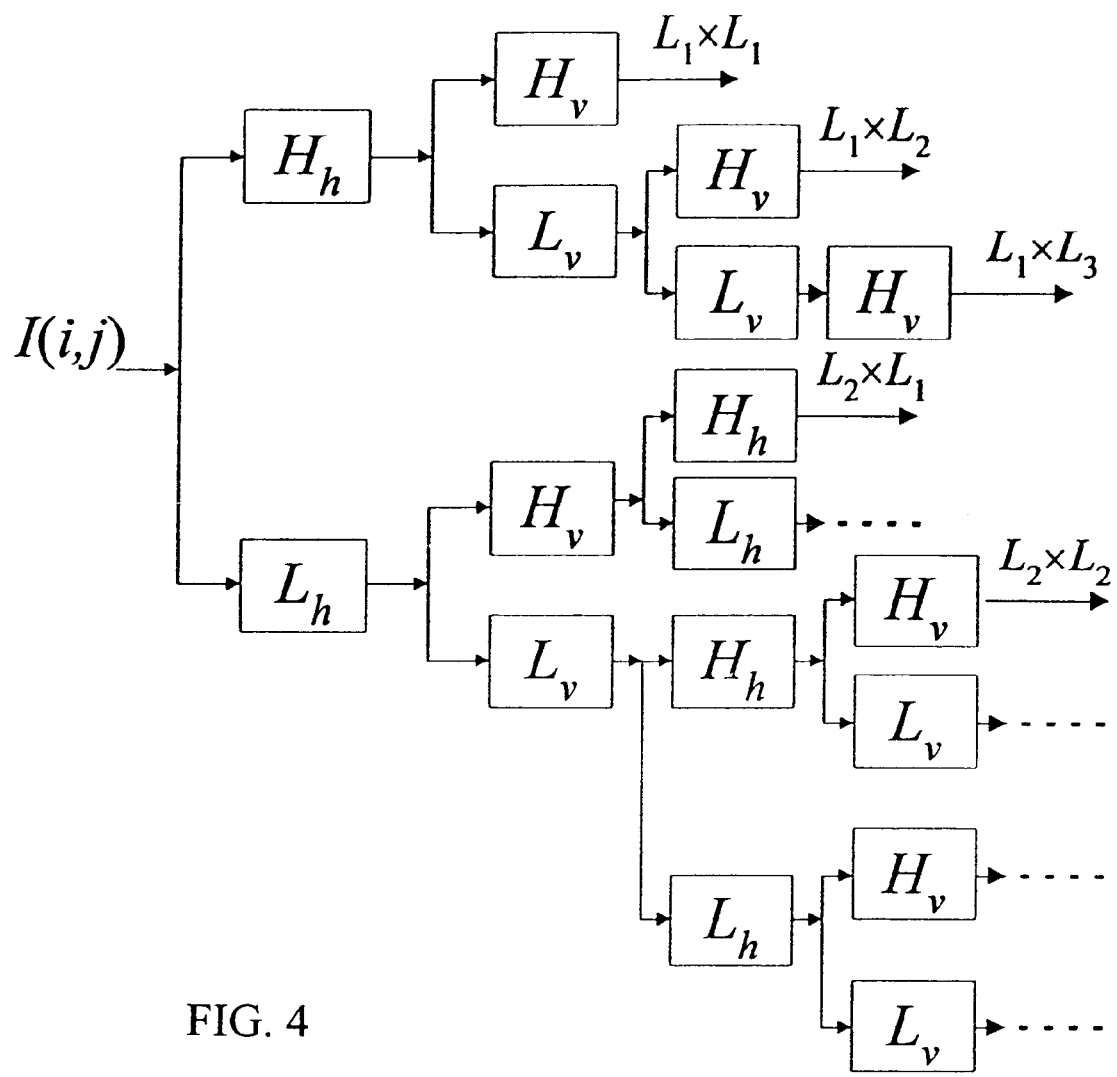
FIG. 4 is a block diagram of a wavelet packet tree for detecting different size singularities in different channels, in which $L_j$ represents the overall length of the filter at scale j.

Hence, the inventors can use the wavelet packet to identify the singularities of different sizes. In FIG. 4, the sizes of the channels are indicated. $L_j$ represents the overall length of the filter at scale j.

The undecimated discrete wavelet transform is used to obtain a better localization of the singularity. Singularities of different scales will be discriminated in different frequency channels. For the methods of the present invention, only images in scales 1–3 may be used, because clustered microcalcifications are mainly distributed in wavelet packet transformed images of scales 1–3. More accurately, in scale channel n, the discriminated singularity should be around the size $2^n \times 2^n$. In scale channel 1, the singularity size should be 2×2, i.e., the smallest microcalcifications with size 1×1 should be detected in this scale. However, most noise singularities will also appear in this scale. Hence, it is difficult to detect this size of microcalcification unless the microcalcifications have the higher greyscale value. This is reasonable to expect since there is no difference between a single point microcalcification pixel and a noise pixel. By minimizing noise levels in a mammograms, this problem can be reduced. Normally, noise pixels will have lower and lower relative energy in the larger scale channels (Mallat and Hwang, 1992; Mallat and Zhong, 1992). Therefore, it will be easier to detect the clustered microcalcifications of a larger size. Note that although the present techniques are not designed for noise reduction, they have some noise reduction functions and they may also be used to remove certain noise. This is because the present techniques look for a specific pattern in images and remove other features of images, including noise. Sometimes, if a specific noise is desired to be removed, the present techniques may be used to look for these noise patterns and remove it. The present techniques may be generally used in segmentation and detection applications of various objects.

Because of the complexity of the mammograms, detection of microcalcifications is not an easy task, even from the wavelet transformed images. Classification between normal pixels and singularity pixels is still necessary. This can be formulated as:

$H_0: I(i,j) \in C_n$ $H_1: I(i,j) \in C_s$ (4)

where $C_n$ denotes the normal tissue pixels class in image I and $C_s$ denotes the singular pixels class.

Assume $p_I(x)$ is the probability distribution function (PDF) of an image I, where x denotes a pixel, then, $p_I(x) = P(C_n)p_n(x) + P(C_s)p_s(x)$ (5)

where $p_n(x)$ is the PDF of the class $C_n$, $P(C_n)$ is the a priori probability of class $C_n$ in image I, $p_s(x)$ is the PDF of the class $C_s$, and $P(C_s)$ is the a priori probability of class $C_s$ in image I. Bayes classifiers give the optimum measure of performance from a statistical point of view (Tou and Gonzalez, 1974). According to Bayes rule, the above classification problem can be solved by Bayes classifier:

$$\frac{p_n(x/C_n)}{p_s(x/C_s)} \overset{H_0}{\underset{H_1}{\gtrless}} \frac{P(C_s)}{P(C_n)}$$ (6)

Figure 5:
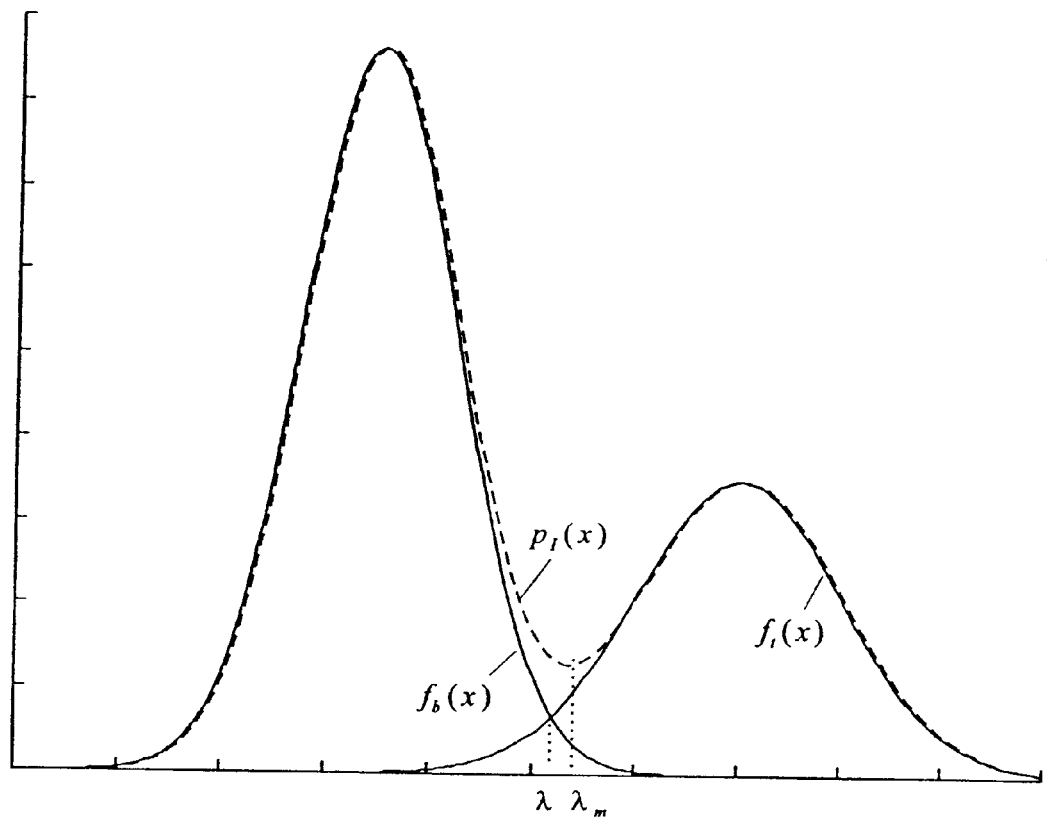
FIG. 5 is a graphical representation of a probability distribution function derived from $P(C_n)p_n(x)$ and $P(C_s)p_s(x)$, respectively.

The above classifier is usually equivalent to the following threshold detection, $$\begin{cases} I(i,j) < \lambda: I(i,j) \in C_n \\ I(i,j) \geq \lambda: (i,j) \in C_s \end{cases} \quad (7)$$

where $\lambda$ is Bayes threshold (Tou and Gonzalez, 1974; Van Trees, 1968). For two Gaussian distribution classes, it is shown as in FIG. 5.

The Bayes threshold is difficult to calculate, since the probability distribution and the a priori probability of both classes are usually not known. Therefore, the present invention proposes a new method to find an adaptive threshold by using the wavelet analysis of PDF, namely, the one dimensional wavelet transform is used to analyze the PDF of the image and to find the "global" local minimum point as a threshold for detection. Note that here the "global" local minimum point means the minimum point of the PDF at a larger scale. Although singularity pixels are mainly distributed in the higher greyscale, they do not form a concentrated "mass" in the PDF's of the images because the number of them is too few, i.e., $P(C_s)$ will be very small.

The image PDF $p_I(x)$ may be computed as the image histogram. Using a multiscale analysis, the singularities in the image may be removed to make it suitable for target segmentation using a threshold classifier. However, there are usually many fluctuations in the PDF's of the images. In practice, there will be many local minima in PDF curves, but it is desired to find the "global" local minimum point. In other words, the local minimum point on a large scale is desired. Again, the wavelet transform may be used to analyze the PDF of the image to find the "global" local minimum point. To get a better localization of the threshold, once again the undecimated DWT may be used.

In the present approach, scales of the wavelet transform are aligned according to the maximum of the curve in the wavelet transform domain. In general, the threshold at some scale of the PDF is chosen by looking for the largest local minimum. One may also find the local minimum at several scales of the PDF, and then use a weighted average as the final threshold for the target segmentation problem.

Next, the corresponding areas of the segmentation in the original image are found. Using the selected threshold, one can get the segmented areas $I_{seg}^{(j)}$ which represent possible targets in the wavelet transformed image at scale j. However, there will be some spatial shift in the target location in the transformed image compared with the original image because of the time delay $L_d$ of the finite impulse response (FIR) wavelet filters. And actually, one pixel in the wavelet transformed image represents a piece of original image, because the image is analyzed by a bank of windows in wavelet transform. The sizes of the windows vary in different scale. This should be taken into account when the segmented areas are mapped to the original image.

Sometimes, several large scale "global" local minima of the image PDF may be obtained. This is because there may not be only one class of bright target. If only two classes are expected, the largest "global" local minimum should be chosen as the threshold for the segmentation of possible target area because it is the most abnormal. That is, assume $\Lambda$ is the set of N local minima of the PDF, i.e., $$\Lambda = \left\{ \lambda_i \left| \frac{\partial p_I(x)}{\partial x} \right|_{x=\lambda_i} > 0 \text{ and } \left| \frac{\partial^2 p_I(x)}{\partial x^2} \right|_{x=i} > 0 \right\} \quad (8)$$

Without loss of generality, assume $\lambda_1 < \lambda_2 < \ldots < \lambda_N$.

The $\lambda_c$ is chosen as follows:

$$\lambda_c = \min_i \{\lambda_i | \lambda_i \in \Lambda \text{ and } \lambda_i \geq x_{max}, i=1, \ldots, N\} \quad (9)$$

where $$X_{max} = \arg \max_x p_I(x) \quad (10)$$

Then the singularity detection can be formulated as, $$\begin{cases} I_{det}(i,j) < \lambda_c: I(i,j) \text{ is normal pixel} \\ I_{det}(i,j) < \lambda_c: I(i,j) \text{ is singular pixel} \end{cases} \quad (11)$$

The present invention uses the one dimensional wavelet analysis to find the "global" local minimum point at the PDF of the wavelet transformed image. To get a better localization of the threshold, once again the undecimated discrete wavelet transform is used. The wavelet transform in all scales may be aligned according to the maximum of the curve in wavelet transform domain at each scale. Either one scale or the "global" local minimum point at several scales (which are then a weighted average) may be used to develop the final threshold.

In the present invention, a scheme to adaptively select the scale of the one dimensional wavelet transform is developed. The singularity map $I_{det}$ for microcalcifications will be a sparse matrix, i.e., there are only a few nonzero elements. Therefore, if the singularity map $I_{det}$ which is obtained using the threshold found in some finer scale is not sparse enough, then a new threshold in a coarser scale should be sought. This can be done easily because the wavelet transform value at coarser scale may be calculated efficiently and quickly from the value at the finer scale by a cascaded fast filter algorithm. Note that the singularities in the image at all scales of interest should be found, because they represent possible microcalcifications with patterns of different sizes.

It is to be understood that a rectangular bright singularity area will be represented by bright pixels at its four corners in its singularity map after the wavelet packet transform at some scale. Therefore, according to the pattern of the different scales of the wavelet packet transform, one can keep significant pixels for the pattern and discard useless pixels in the singularity map $I_{det}$ at each scale. Then, one may obtain the adjusted singularity map $I'_{det}$ for each scale. The above method is computationally efficient, since many manipulations here are for binary sparse matrix.

Next, one should locate regions in the original image corresponding to the singularity map $I_{det}$. Using adaptive thresholding, one may obtain the singularity map $I_{det}$, which represents possible microcalcifications in the wavelet packet transformed image at scale (i,j). However, there will be some spatial shift in the target location in the transformed image compared with the original image because of the time delay $L_d$ of the FIR wavelet filters. Actually, one pixel in the wavelet transformed image represents a piece of the original image, because the image is analyzed by a bank of windows in wavelet transform. The sizes of the windows vary in different scales. One should take this point into account when the segmented areas are mapped to the original image. It is to be understood that for Haar wavelets, the area of microcalcifications will be ¼ of the corresponding singularities. (As shown in Table 1, for the one dimensional case, the size of microcalcifications should be the half of the singularities.)

In the dyadic DWT, assume the length of the scaling filter H and the wavelet filter G is L. Since the overall scaling filter and wavelet filter at scale j should be $\Pi_{i=0}^{j-1} \sqrt{2^i} H(z^{2^i})$ and $G(z^{2j-i})\Pi_{i=1}^{j-2}\sqrt{2^i}H(z^{2i})$, respectively, it is understood that the length of the overall scaling filter and wavelet filter is $L_j=(2^j-1)L-2^j+2$. Hence, one pixel of image at scale j represents an area with at most a size of $L_j \times L_j$ in the original image, and the position of the pixel is the center of this area. The adjusted segmentated area $I_{seg}$ in the original image using the singularity map $I_{det}$ at scale (i,j) is $$I_{seg}^{(i,j)}(m, n) = \begin{cases} 1, & \text{if } I_{det}^{\prime(i,j)}(k, l) = 1 \text{ and} \\ & (m, n) \in [(k - L_d^i, l - L_d^j), (k - L_d^i + L_i/2 - 1, l - L_d^j + L_j/2 - 1)] \\ 0, & \text{otherwise.} \end{cases} \quad (12)$$

By this procedure, segmentation of microcalcifications at each scale may be obtained. Then, by taking the union of these segmentation results at different scales, a final segmentation area can be obtained. The detection results may also be used as the mask of original image when needed.

The following examples illustrate digital image analysis using the methods of the present invention. The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Figure 6A:
FIG. 6a is an illustration of a real patient's mammogram image.

Example 1 is a 512×512 pixel mammogram image with 4096 (12 bits) greyscale. The original image is shown as FIG. 6a.

Figure 6B:
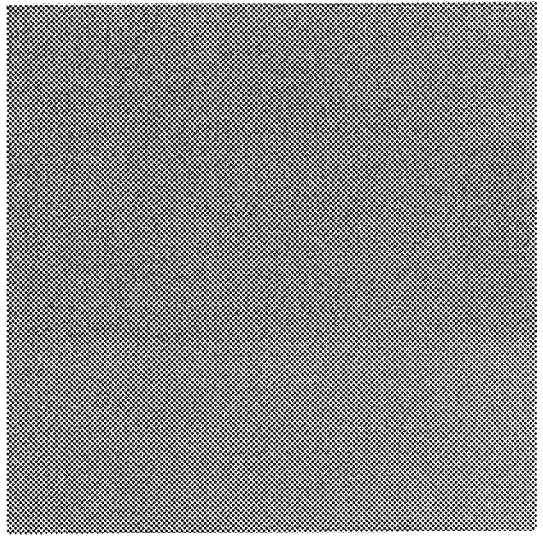
FIGS. 6b–d is an illustration of the detail images in $H_hH_v$ frequency channels at scale (j,j),j=1, 2, 3) of discrete wavelet packet transform.
Figure 6C:
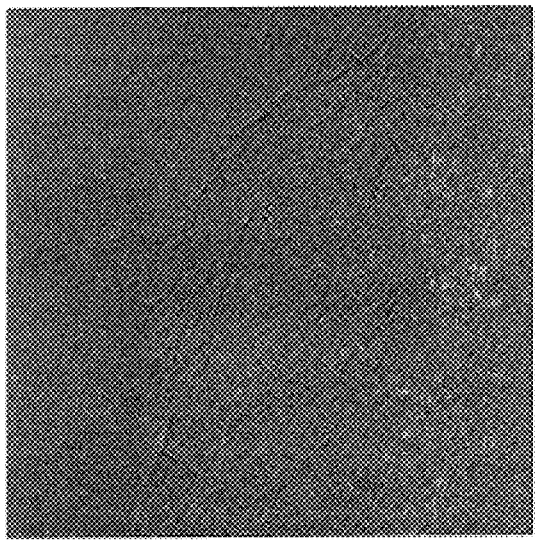
Figure 6D:
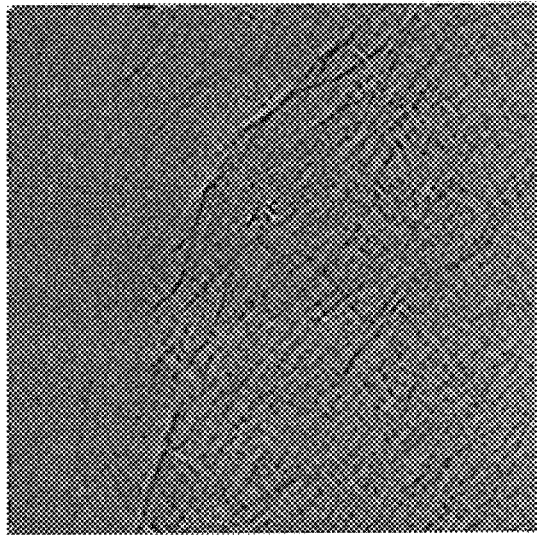
Figure 7A:
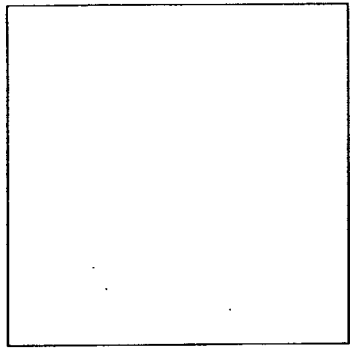
FIGS. 7a–i is an illustration of detected microcalcifications of different sizes in wavelet packet channels. (a) Scale (1,1). (b) Scale (1,2). (c) Scale (1,3). (d) Scale (2,1). (e) Scale (2,2). (f) Scale (2,3). (g) Scale (3,1). (h) Scale (3,2). (i) Scale (3,3).
Figure 7B:
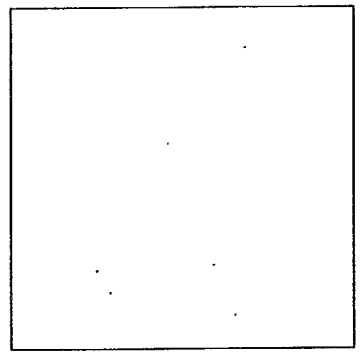
Figure 7C:
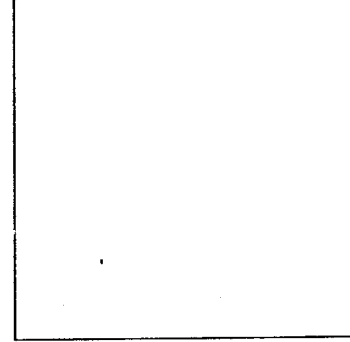
Figure 7D:
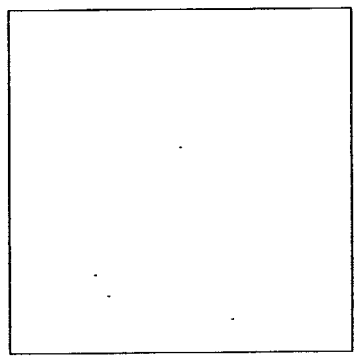
Figure 7E:
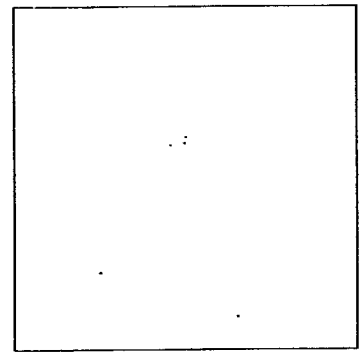
Figure 7F:
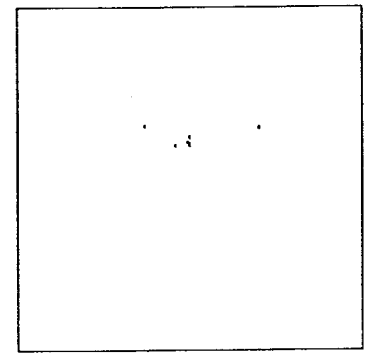
Figure 7G:
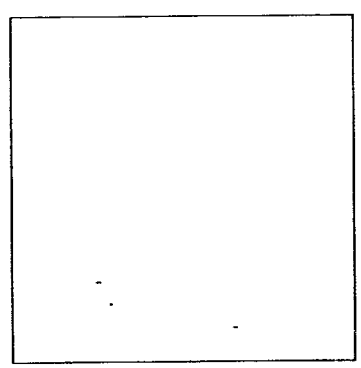
Figure 7H:
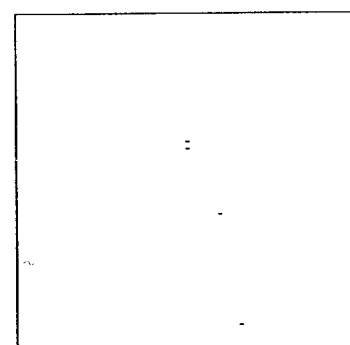
Figure 7I:
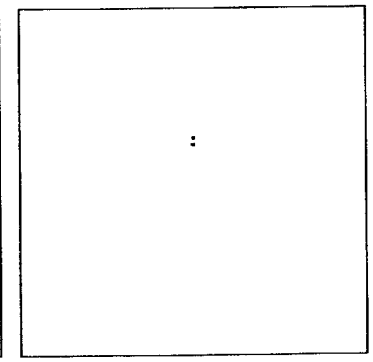
Figure 8:
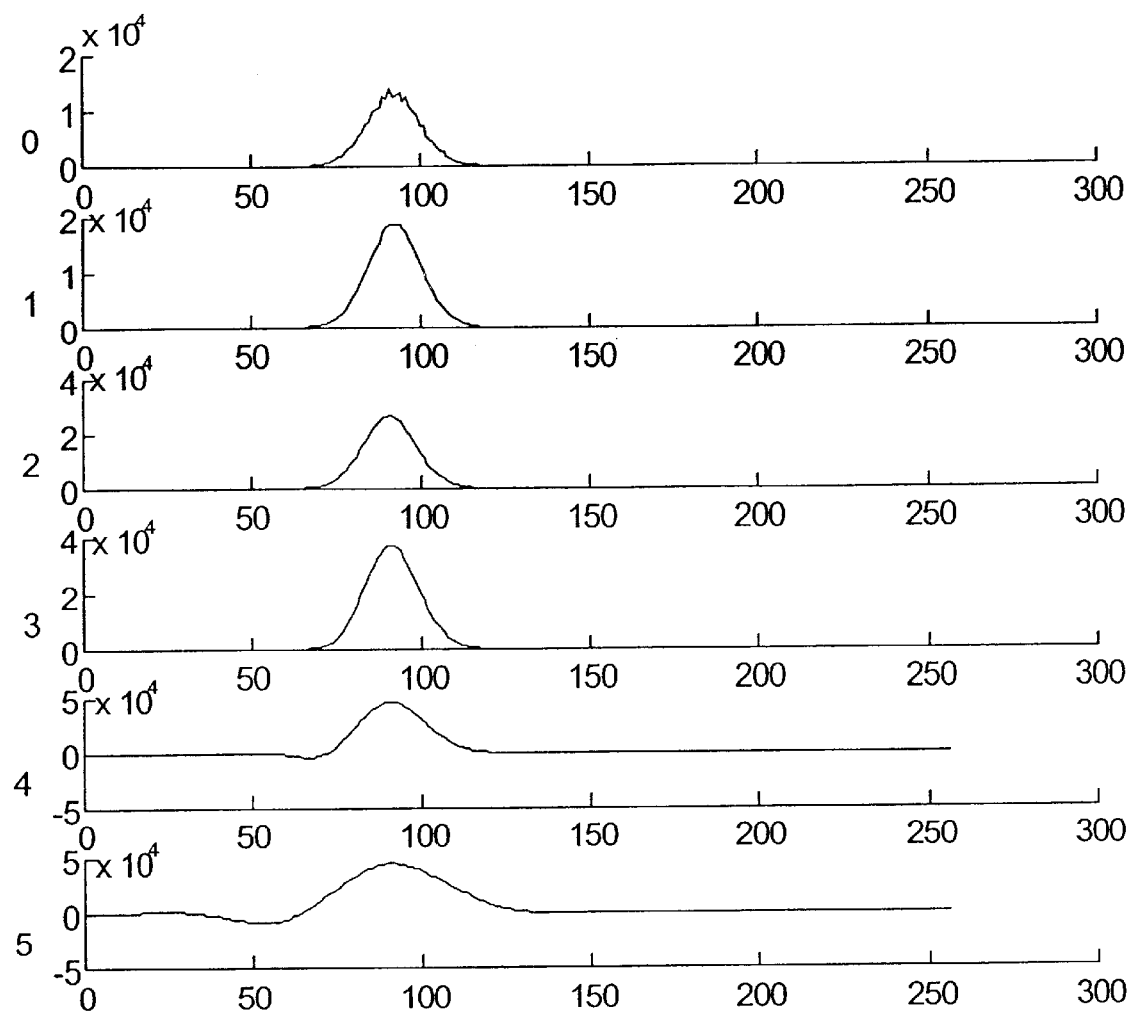
FIG. 8 is a graphical representation of five scales of one dimensional wavelet transform of a PDF of wavelet packet transformed image at scale (2,2), shown in FIG. 6c.
Figure 9A:
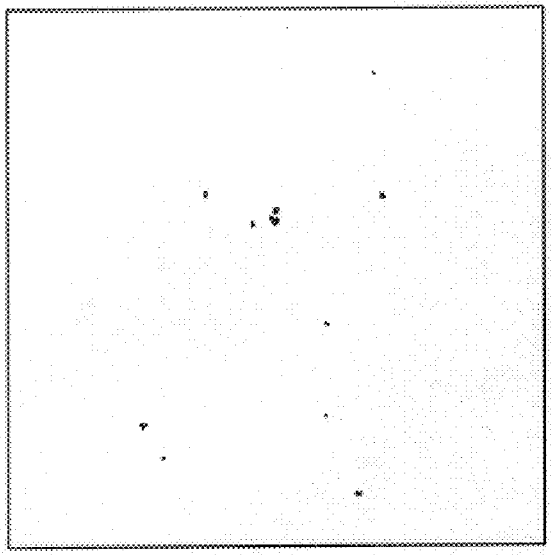
FIG. 9a is an illustration of combined detected microcalcifications.
Figure 9B:
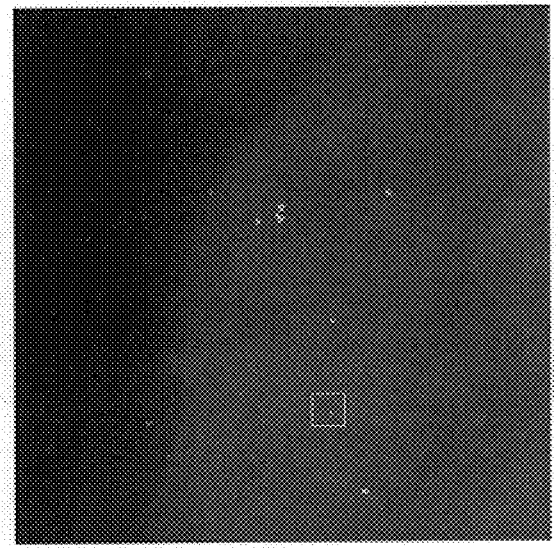
FIG. 9b is an illustration of the image of FIG. 9a as a mask of the original image.
Figure 9C:
FIG. 9c is an illustration of the original mammogram image.
Figure 9D:
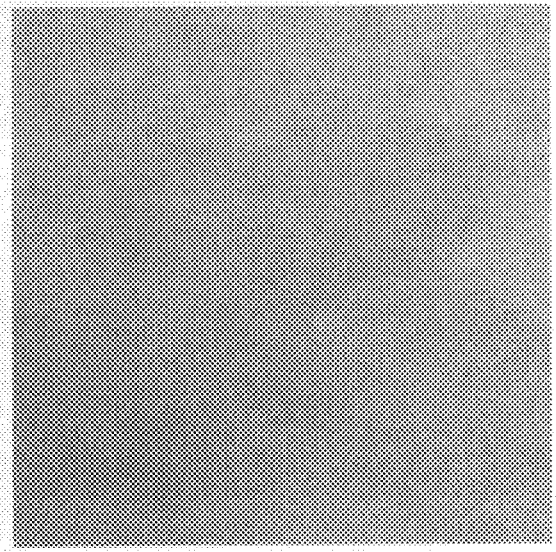
FIG. 9d is an illustration of the zooming of the image in the box in FIG. 9c.

FIGS. 6b–d show wavelet transformed images in $H_hH_v$, channels scale 1–3. FIGS. 7a–7i show all detected microcalcifications using all wavelet packet channels. FIG. 8 shows the PDF of the wavelet packet transformed image at scale (2, 2), and its one dimensional wavelet transform at 5 scales, which can be used to find the adaptive threshold. Daubechies 6 tap wavelet (Daubechies, 1992) is also used for this one dimensional analysis. FIG. 9a shows the combined detected microcalcifications using all wavelet packet channels. In FIG. 9b, the above results are used as the mask for the original image. All the microcalcifications are detected using the present method, even the low contrast microcalcifications present in the actual X-ray film, but not visible with usual observations in the digitized image. An enlarged version of the box in FIG. 9c is shown in FIG. 9d, which is the same area in the box of FIG. 9b. It can be seen that there is a low contrast microcalcification within this box which was successfully detected.

EXAMPLE 2

Figure 10A:
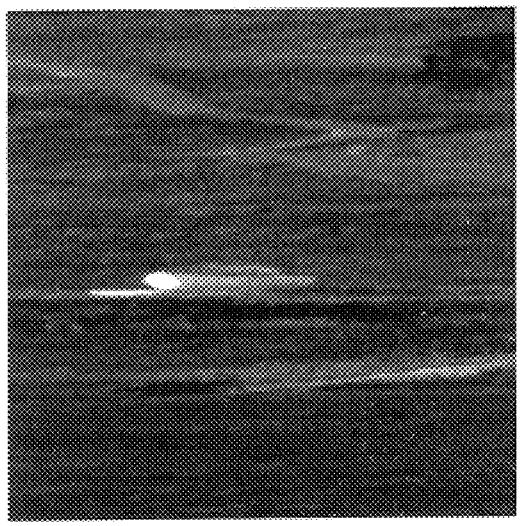
FIG. 10a is an illustration of an original forwarding looking infrared (FLIR) image of a tank.
Figure 10B:
FIGS. 10b–e are illustrations of the detail images in $H_hH_v$ frequency channels at scale (j,j),j=1, 2, 3) of a discrete wavelet packet transform of the image of FIG. 10A.
Figure 10C:
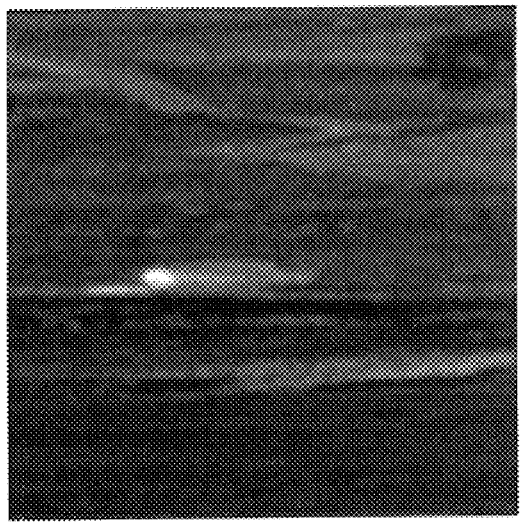
Figure 10D:
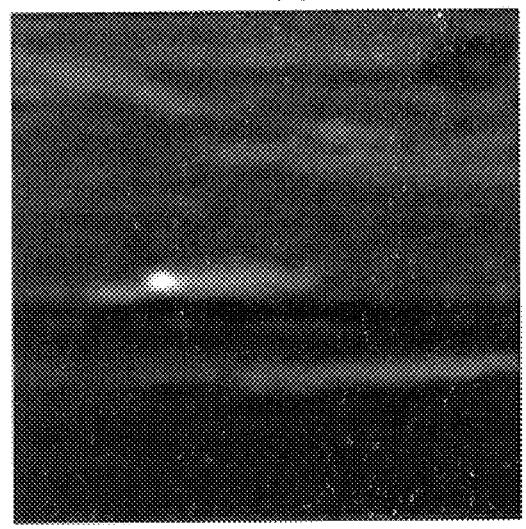
Figure 10E:
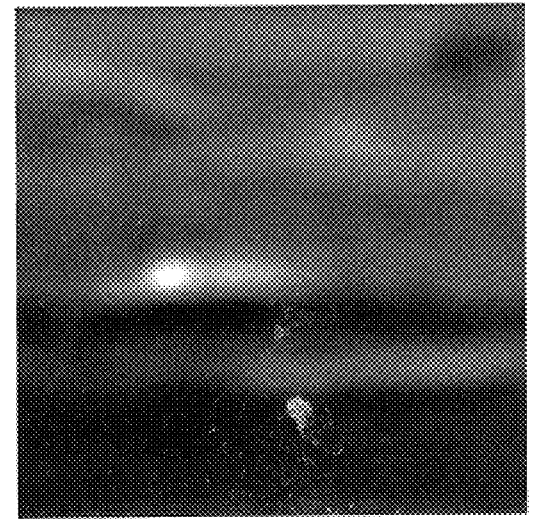
Figure 11:
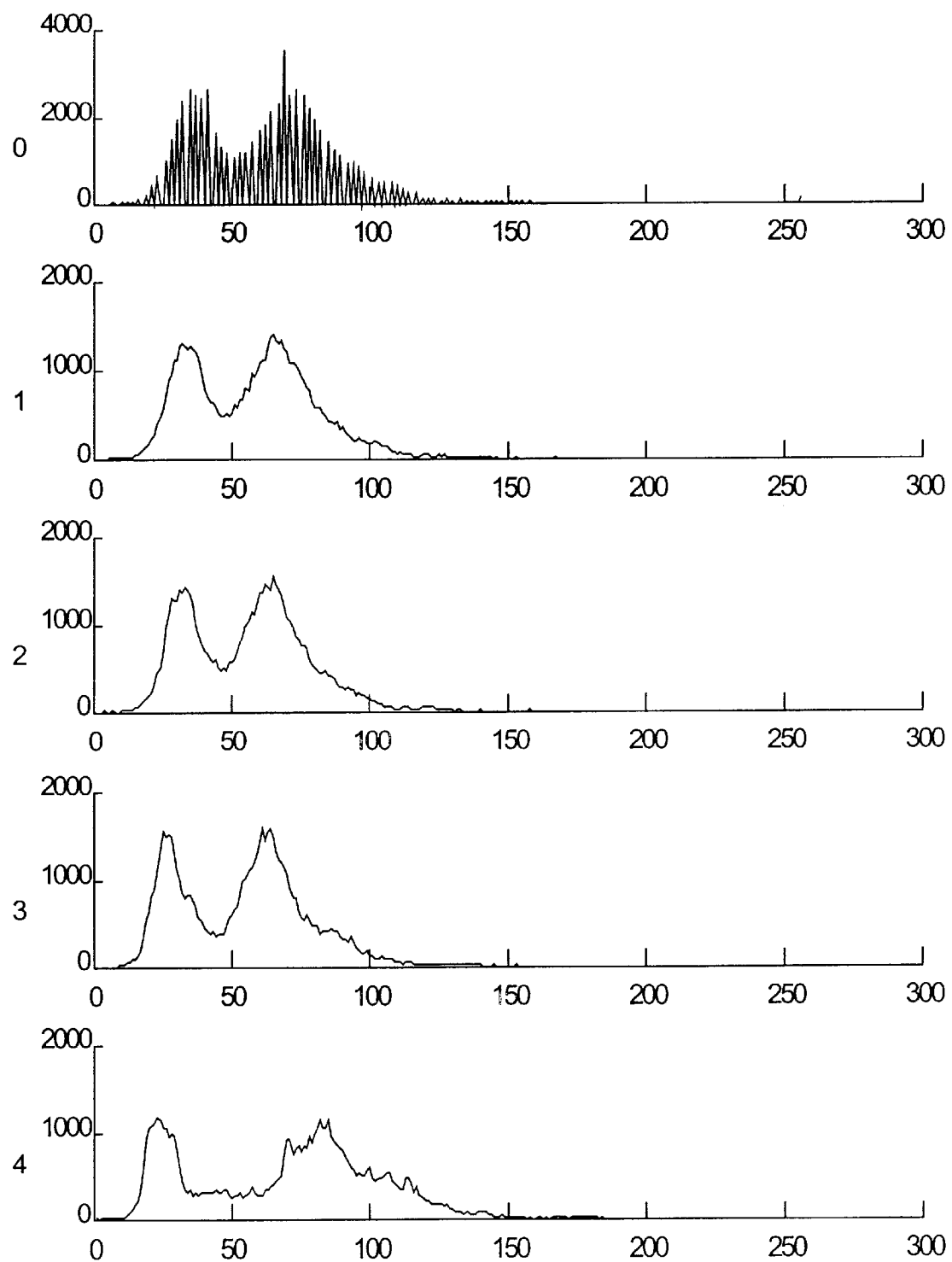
FIG. 11 is an illustration of the four transformed images of FIGS. 10b–e. The top illustration shows the histogram of the original image.
Figure 12:
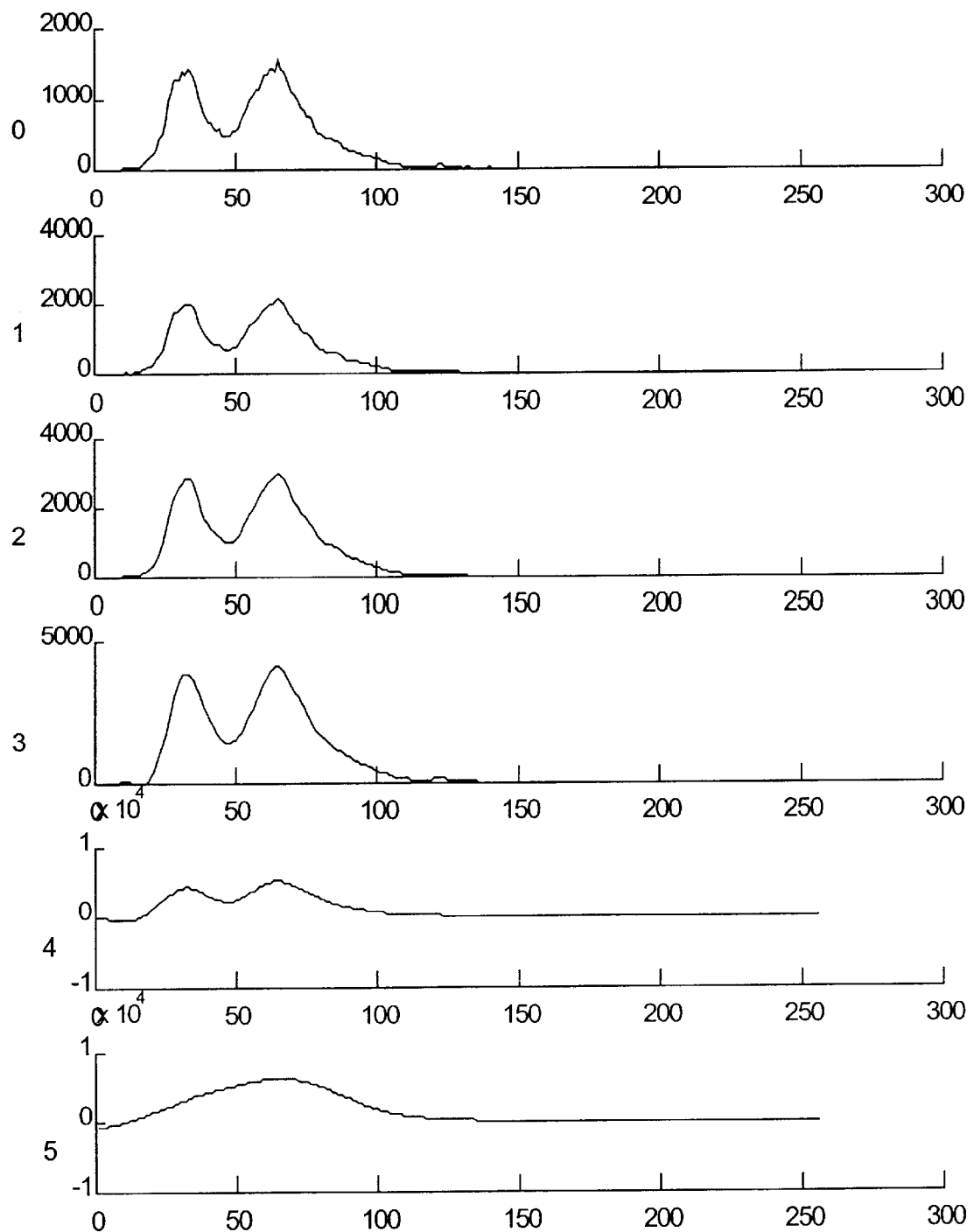
FIG. 12 is a graphical representation of five scales of a dimensional wavelet transform of a PDF of the wavelet packet transformed image at scale (2,2), shown in FIG. 10c.
Figure 15A:
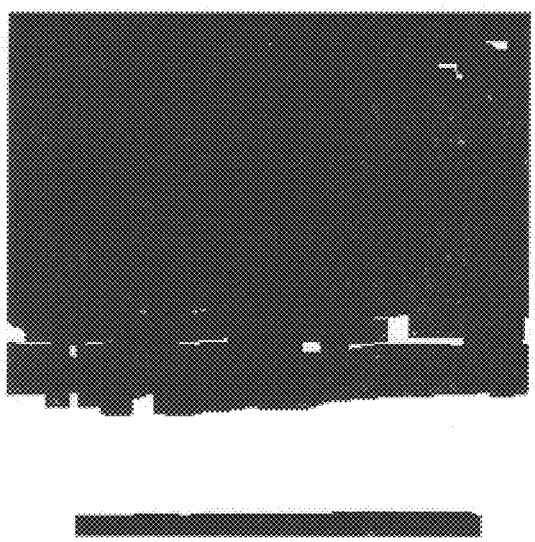
FIG. 15a is an illustration of a segmentation area using $\lambda_1$.
Figure 15B:
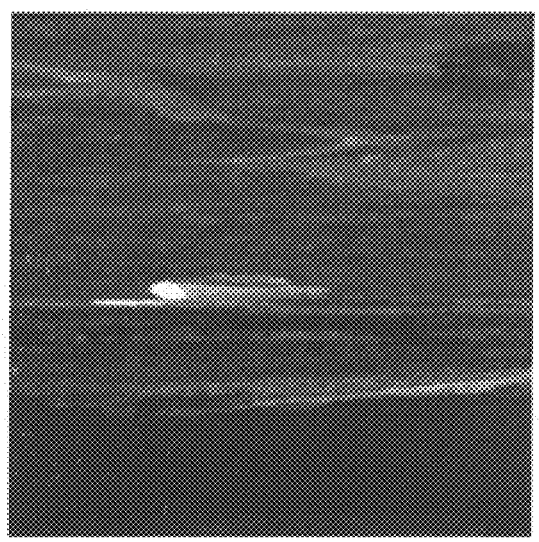
FIG. 15b is an illustration of the masked image of FIG. 15a by $I_{seg}$·I+I.

Another example using the methods of the present invention is a 256×256 pixel forward looking infrared (FLIR) image of a tank with 256 greyscale. The original image is shown in FIG. 10a. The $L_hL_v$ part of its wavelet transform from scales 1 to 4 are shown in FIGS. 10b–e. The $L_hL_v$ part is used because here the target is a bright blob, which is different from the appearance of microcalcifications (which are singularities). FIG. 11 shows the PDF of these four transformed images. The image in scale 2 for segmentation is used, and 5 scale wavelet transform for the histogram of the image in scale 2 is taken, as illustrated in FIG. 12. The curve in scale 4 is used to obtain local minima. Because this image is a little noisy, unnecessary details with very low probability are abandoned when the PDF curve is processed. FIGS. 13a–15a show the segmentation results using local minima $\lambda_3 > \lambda_2 > \lambda_1$ as thresholds, respectively. FIGS. 13b–15b show the corresponding masked images by $I_{seg}$–I+I. As shown in FIG. 13a, the brightest highlight areas appear. The areas of the tank and some other bright areas appear in FIG. 13b. The largest difference between two classes, the sky and the ground as seen from the original image of FIG. 10a, is evident in FIG. 15b.

In this example, it is seen that segmented areas contain the areas of interest. Of course, if more details, such as edges of objects, were desired, other algorithms may be used in the selected areas to obtain them. Such a method is far more efficient than using the algorithms in whole images. As previously discussed, the present method may also be iterated hierarchically, using different scales at each stage.

The present invention thus utilizes an optimized mother wavelet (for a particular application) and presents a new method for the detection and segmentation of microcalcifications in a mammogram image. Wavelet packet analysis is used in the present method and the Bayes classifier is employed for detection of microcalcifications with different size. An approach for choosing the threshold adaptively by using one dimensional wavelet analysis to look for the "global" local minima of the PDF of wavelet transformed images is presented. The examples show that the present method is very effective in detecting targets ranging from microcalcifications of very low to very high contrast to a tank within a FLIR image.

Also, the present invention may be used as a pre-processing step for other algorithms, such as a boundary based algorithm. Furthermore, a knowledge-based decision system, according to the distribution of microcalcifications and other features of mammograms, may also be constructed for further processing.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are cited throughout the specification, and are specifically incorporated herein by reference.

Akansu and Smith, *Subband and wavelet transforms*, Kluwer Academic Publishers, 1996.

Bassell and Gold, In: *Breast Cancer Detection*, Grune and Stratton, 1987.

Bowyer and Astley, *State of the Art in Digital Mammographic Image Analysis*, World Scientific, 1994.

Brzakovic, Luo, Brzakovic, "An approach to automated detection of tumors in mammograms," *IEEE Trans. on Medical Imaging*, 9(3):233–241, 1990.

Chitre and Dhawan, "Adaptive wavelet analysis and classification of mammographic microcalcification," *In: Digital Mammography*, Doi, Giger, Nisblkawa, Schmidt, Eds., 323–326, Elsevier Science B., 1996.

Cohen, "Time-frequency distributions—a review," *Proc. of IEEE*, 77(7):941–981, 1989.

Coifman, Meyer, Wickerhauser, "Wavelet analysis and signal processing," In: *Wavelets and their applications*, Ruskai et al., Ed., 153–178, Jones and Bartlett, Boston, Mass., 1992.

Daubechies, *Ten Lectures on Wavelets*, Philadelphia, SIAM, 1992.

Dengler, Behrens, Desaga, "Segmentation of microcalcifications in mammograms," *IEEE Trans. on Medical Imaging*, 12(4):634–642, 1993.

Herley, Fovacevic, Rarnchandran, Vetterli, "Tilings of the time-frequency plane: construction of arbitrary orthogonal bases and fast tiling algorithms," *IEEE Trans. on Signal Processing.*, 41(12):3341–3359, 1993.

Kopans, In: *Breast Imaging*, Lippincott Company, Philadelphia, 1989.

Mallat and Hwang, "Singularity detection and processing with wavelets," *IEEE Trans. on Info. Theo.*, 38(2):617643, 1992.

Mallat and Zhong, "Characterization of signals from multiscale edges," *IEEE Trans. on PAMI.*, 14(7):710–732, 1992.

Mallat, "A theory for multiresolution signal decomposition: the wavelet representation,"*IEEE Trans. on PAMI.*, 11(7):674–693, 1989.

McLeod, Parkin, Cowen, "Automatic detection of clustered microcalcifications using wavelets," In: *Digital Mammography*, Doi, Giger, Nishikawa, Schmidt, Eds., 311–316, Elsevier Science B.V., 1996.

Ramchandran and Vetterli, "Best wavelet packet bases in a rate-distortion sense," *IEEE Trans. on Image Processing.*, 2(2): 160–173, 1993.

Rioul and Duhamel, "Fast algorithms for discrete and continuous wavelet transforms," *IEEE Trans. on Info. Theo.*, 38(2):569–586, 1992.

Rioul and Vetterli, "Wavelet and signal processing," *IEEE Signal Proc. Mag.*, (8):14–38, 1991.

Rioul, "A discrete-time multiresolution theory," *IEEE Trans. on Signal Prac.*, 41(8):2691–2606, 1993.

Shensa, "The discrete wavelet transform: Wedding the trous and mallat algorithms," *IEEE Trans. on Signal Proc.*, 40(10):2464–2482, 1992.

Strickland and Hahn, "Wavelet transforms for detecting microcalcifications in mammography," *Proc. ICIP-94*, Austin, Tex., Nov. 13–16, (1):402–405, 1994.

Strickland and Hahn, "Wavelet transforms for detecting microcalcifications in mammogramns," *IEEE Trans. on Medical Imaging*, 15(2):218–229, 1996.

Tou and Gonzalez, In: *Pattern Recognition Principles*, Addison-Wesley, Inc., MA, 1974.

Van Trees, In: *Detection, Estimation, and Modulation theory*. Part I, John Wiley and Sons, Inc., New York, 1968.

Yoshida, Nishikawa, Giger, Doi, "Optimally weighted wavelet packets for detection of clustered microcalcifications in digital mammograms," In: *Digital Mammography*, Doi, Giger, Nishikawa, Schmidt, Eds., 317–322, Elsevier Science B., 1996.

Yoshina, Zhang, Doi Cai, Nishikawa, Giger, "Optimizing wavelet transform based on supervised learning for detection of microcalcifications in digital mammograms," *Proc. ICIP-95*, Washington, D.C., 23–26, (3):152–155, 1995.

Zhang, Tian, Peng, "From the wavelet series to the discrete wavelet transform—the initialization," *IEEE Trans. on Signal Proc.*, 44(1), 1996.

What is claimed is:

1. A method of determining an adaptive threshold for a wavelet analysis of a digital image, comprising the steps of:

decomposing the digital image by wavelet packet transform to obtain a plurality of transformed images of different scale channels;

obtaining a histogram of said transformed images;

decomposing the histogram by wavelet transform to obtain a plurality of histogram images of different scale channels; and selecting said adaptive threshold from said plurality of histogram images.

2. The method of claim 1, wherein said digital image comprises a mammogram.

3. The method of claim 1, wherein said digital image comprises a forward-looking infrared image.

4. A method of determining an adaptive threshold for a wavelet analysis of a digital image, comprising the steps of:

decomposing the digital image by wavelet packet transform to obtain a plurality of transformed images of different scale channels; and selecting a minimum point of a probability distribution function of said plurality of transformed images by performing a wavelet analysis of the probability distribution function.

5. The method of claim 4, wherein said digital image comprises a mammogram.

6. The method of claim 4, wherein said digital image comprises a forward-looking infrared image.

7. A method for automatically detecting an abnormal portion of a digital image, comprising the steps of:

obtaining the digital image;

selecting a mother wavelet optimized for said digital image;

decomposing the digital image by wavelet packet transform into a plurality of channels;

determining an adaptive threshold from all of said plurality of channels by finding a local minimum point for each of one or more scales of a probability distribution function of the image transform;

comparing said adaptive threshold to each of said plurality of channels;

eliminating each of said plurality of channels less than said minimum threshold to obtain an adjusted singularity map;

restoring said adjusted singularity map to restored image; and locating regions in said digital image corresponding to said restore image.

8. The method of claim 7, wherein said digital image comprises a mammogram.

9. The method of claim 7, wherein said digital image comprises a forward-looking infrared image.

10. A method of obtaining a microcalcifications map of a digitalized mammogram image, comprising the steps of:

inputting said digitalized mammogram image into a processing system;

preprocessing said image;

obtaining wavelet packet transforms of the image to obtain transformed images;

performing wavelet-based analysis of a probability distribution function of the transformed images at a plurality of channels;

selecting thresholds and obtaining segmented images for each said plurality of channels;

mapping the segmented images of each said channel to the original digitalized mammogram image to obtain a plurality of mapped images; and combining all of the mapped images to obtain the microcalcifications map.

11. A method of obtaining a microcalcifications map of a digitalized mammogram image, comprising the steps of:

inputting said digitalized mammogram image into a processing system;

preprocessing said image;

obtaining wavelet packet transforms of the image to obtain transformed images;

performing wavelet-based analysis of probability distribution function of the transformed images at a plurality of channels;

selecting thresholds and obtaining segmented images for each said plurality of channels;

mapping the segmented images of each said channel to the original digitalized mammogram image to obtain a plurality of mapped images; and combining all of the mapped images to obtain the microcalcifications map;

wherein said selecting and obtaining step further comprises the step of:

selecting a one dimensional wavelet analysis for each said plurality of channels and obtaining a wavelet transformed probability distribution function; and using a first local minimum larger than a middle point of the transformed probability distribution function as the threshold.

12. The method of claim 1, wherein the threshold is determined as a local minimum point of a scale of the histogram of the transformed image.

13. The method of claim 1, wherein the threshold is determined as the largest local minimum point of the scales of the histogram of the transformed image.

14. The method of claim 1, wherein the threshold is determined as a weighted average of the local minima of the scales of the histogram.

15. The method of claim 7, wherein the threshold is determined as a local minimum point of a scale of the PDF of the transformed image.

16. The method of claim 7, wherein the threshold is determined as the largest local minimum point of the scales of the PDF of the transformed image.

17. The method of claim 7, wherein the threshold is determined as a weighted average of the local minima of the scales of the PDF.

18. A method of determining an adaptive threshold for a wavelet analysis of a digital image, comprising the steps of:

decomposing the digital image by wavelet transformation to obtain a plurality of transformed images of different scale channels; and determining the largest local minimum point of scales of a wavelet transformed probability distribution function of the transformed images.

19. The method of claim 18, wherein the probability distribution function is determined as the histogram of the image transforms.

20. A method of determining an adaptive threshold for a wavelet analysis of a digital image, comprising the steps of:

decomposing the digital image by wavelet transformation to obtain a plurality of transformed images of different scale channels; and determining a weighted average of a plurality of local minimum points of scales of a wavelet transformed probability distribution function of the transformed images.

21. The method of claim 20, wherein the probability distribution function is determined as the histogram of the image transforms.

* * * * *

UNITED STATES PATENT AND TRADEMARK OFFICE
CERTIFICATE OF CORRECTION

PATENT NO.     : 6,434,261 B1
DATED          : August 13, 2002
INVENTOR(S)    : Zhang et al.

It is certified that error appears in the above-identified patent and that said Letters Patent is hereby corrected as shown below:

Column 15,
Line 27, please insert -- a -- between "of" and "probability".

Signed and Sealed this

Eighteenth Day of February, 2003

JAMES E. ROGAN
*Director of the United States Patent and Trademark Office*